(12) United States Patent
Hachiya et al.

(10) Patent No.: US 6,873,372 B2
(45) Date of Patent: Mar. 29, 2005

(54) CLIPPING CIRCUIT AND IMAGE PROCESSING DEVICE EMPLOYING SUCH A CLIPPING CIRCUIT

(75) Inventors: Takeshi Hachiya, Kasai (JP); Akihiro Maenaka, Kadoma (JP)

(73) Assignee: Sanyo Electric Co., LTD, Moriguchi (JP)

( * ) Notice: Subject to any disclaimer, the term of this patent is extended or adjusted under 35 U.S.C. 154(b) by 440 days.

(21) Appl. No.: 09/905,199

(22) Filed: Jul. 16, 2001

(65) Prior Publication Data

US 2002/0015534 A1 Feb. 7, 2002

(30) Foreign Application Priority Data

Jul. 17, 2000 (JP) ........................................ 2000-216506

(51) Int. Cl.[7] ............................ H04N 5/208; G06K 9/00
(52) U.S. Cl. ..................... 348/625; 348/606; 382/266
(58) Field of Search ............................... 348/625, 606, 348/607, 630, 627, 252, 26; 382/266, 270, 273, 199

(56) References Cited

U.S. PATENT DOCUMENTS

| | | | |
|---|---|---|---|
| 4,860,371 A | * 8/1989 | Matsuyama et al. | 382/149 |
| 5,060,284 A | * 10/1991 | Klees | 382/252 |
| 5,311,328 A | 5/1994 | Murata | 358/447 |
| 5,454,052 A | * 9/1995 | Kojima | 382/233 |
| 5,581,306 A | * 12/1996 | Ohara | 348/625 |
| 5,583,659 A | * 12/1996 | Lee et al. | 358/3.13 |
| 5,760,922 A | * 6/1998 | Kojima | 358/464 |
| 5,825,937 A | * 10/1998 | Ohuchi et al. | 382/261 |
| 5,880,767 A | * 3/1999 | Liu | 347/251 |
| 5,974,193 A | * 10/1999 | Baudouin | 382/261 |
| 6,088,065 A | * 7/2000 | Uchida | 348/625 |
| 6,363,526 B1 | * 3/2002 | Vlahos et al. | 725/37 |

FOREIGN PATENT DOCUMENTS

| | | |
|---|---|---|
| EP | 0 901 103 A2 | 3/1999 |
| JP | 62-222777 | 9/1987 |
| JP | 2-182083 | 7/1990 |
| JP | 9-027955 | 1/1997 |
| JP | 2000-138845 | 5/2000 |

\* cited by examiner

*Primary Examiner*—Michael H. Lee
*Assistant Examiner*—Paulos M. Natnael
(74) *Attorney, Agent, or Firm*—Arent Fox

(57) ABSTRACT

In an image processing device, an edge detecting circuit 1 produces edge signals that represent edge components present in image signals, and an adder circuit 2 superimposes the edge signals on the image signals to produce edge-enhanced image signals. The image signals before edge enhancement are fed to a range setting circuit 3 so that, based on the image signals preceding and following a target image signal that is about to be processed by a clipper 4, a range in which the data value of the target image signal is allowed to vary is set. Based on the range of data values thus set by the range setting circuit 3, the clipper 4 clips the data values of the edge-enhanced image data.

13 Claims, 5 Drawing Sheets

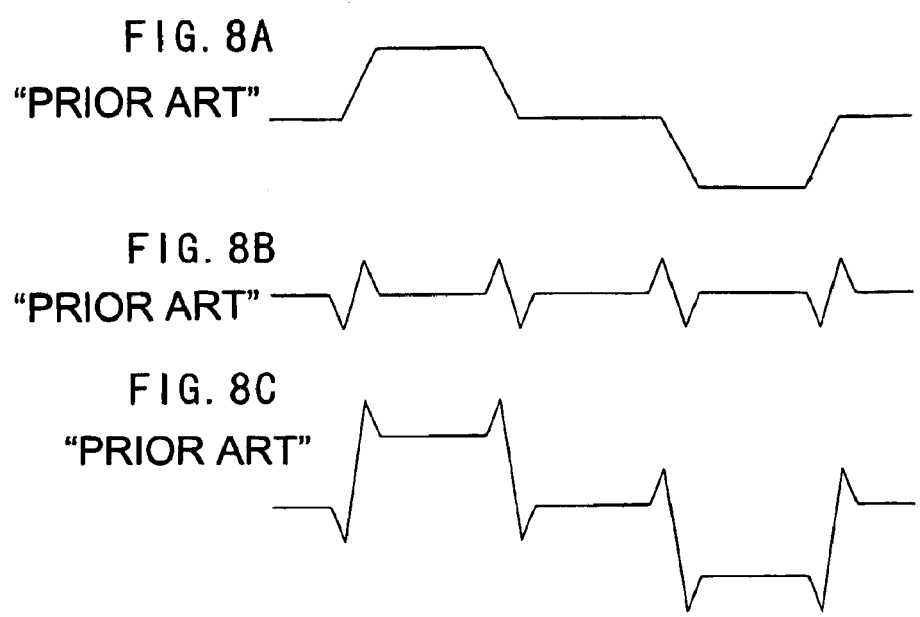

CLIPPING CIRCUIT AND IMAGE PROCESSING DEVICE EMPLOYING SUCH A CLIPPING CIRCUIT

BACKGROUND OF THE INVENTION

1. Field of the Invention

The present invention relates to a clipping circuit for performing wave shaping on a signal fed thereto, and to an image processing device employing such a clipping circuit. The present invention relates particularly to a clipping circuit for clipping edge-enhanced image signals, and to an image processing device employing such a clipping circuit.

2. Description of the Prior Art

Conventionally, Laplacian processing is used to obtain satisfactory contrast and sharpness in a reproduced image by making the outline of a subject clear. Laplacian processing achieves edge enhancement by adding, to the image signals output from individual pixels to represent a subject of which the outline is to be targeted, signals representing edge components that are calculated by using Laplacian operator, which is a second-order differential operator. FIGS. 8A to 8C show how image signals undergo Laplacian processing. When image signals as shown in FIG. 8A are fed in, edge signals representing edge components as shown in FIG. 8B are calculated. Then, as shown in FIG. 8C, the edge components represented by those edge signals are superimposed on the image signals, so that edge-enhanced image signals are produced. In this way, it is possible to obtain enhanced sharpness and satisfactory contrast in a reproduced image.

As described above, by superimposing edge components represented by edge signals on image signals, it is possible to make changes in data values (i.e. changes in signal intensity) at edges sharper, and thereby obtain an edge-enhanced image. However, as FIG. 8C clearly shows, as a result of Laplacian processing, in the image signals that give the data values at edges, preshoots occur in low-data-value portions, and overshoots occur in high-data-value portions. This causes ringing at edges in the reproduced image, and thereby makes the reproduced image appear unnatural.

SUMMARY OF THE INVENTION

An object of the present invention is to provide a clipping circuit that can clip image signals that are fed thereto to enhance the sharpness of the image they represent without causing ringing in the reproduced image, and to provide an image processing device employing such a clipping circuit.

To achieve the above object, according to one aspect of the present invention, a clipping circuit is provided with: a clipper for clipping a target signal fed thereto within a range of data values set for the target signal; a subtractor for subtracting, from the data value of the target signal to be clipped by the clipper, each of the data values of adjacent signals located a predetermined interval away from the target signal before and after the target signal; a minimum value setter for setting, as the minimum value of the range of data values for the target signal, the data value of one of the two adjacent signals that, when subtracted from the data value of the target signal, yields a difference greater than a first threshold value; and a maximum value setter for setting, as the maximum value of the range of data values for the target signal, the data value of one of the two adjacent signals that, when subtracted from the data value of the target signal, yields a difference smaller than a second threshold value. Here, when the data value of the target signal fed to the clipper falls within the range of data values set for the target signal by the maximum value and minimum value setters, the target signal is output intact; when the data value of the target signal fed to the clipper is smaller than the minimum value, the target signal is output after being clipped at the minimum value; and, when the data value of the target signal fed to the clipper is greater than the maximum value, the target signal is output after being clipped at the maximum value.

According to another aspect of the invention, an image processing device is provided with: an edge detecting circuit for performing second-order differentiation on image signals fed thereto to detect edge components and output edge signals representing the edge components; an edge enhancement circuit for superimposing the edge signals on the image signals to perform edge enhancement on the image signals; a range setting circuit for comparing, for each of the image signals obtained from individual pixels, the data value of a target image signal obtained from the pixel targeted by the edge enhancement with each of the data values of two adjacent image signals obtained from the pixels adjacent to the targeted pixel to set a range of data values in which the data value of the target image signal is allowed to vary by setting as the maximum value the data value of one of the two adjacent image signals whose data value is greater than the data value of the target image signal and setting as the minimum value the data value of one of the two adjacent image signals whose data value is smaller than the data value of the target image signal; and a clipper for making the data value of the target image signal equal to the maximum or minimum value of the range set by the range setting circuit when the data value of the target image signal output from the edge enhancement circuit is greater than the maximum value or smaller than the minimum value, respectively, of the range set by the range setting circuit and for otherwise leaving intact the data value of the target image signal as obtained after the edge enhancement.

BRIEF DESCRIPTION OF THE DRAWINGS

This and other objects and features of the present invention will become clear from the following description, taken in conjunction with the preferred embodiments with reference to the accompanying drawings in which:

FIGS. 8A to 8C are time charts of relevant signals, illustrating the operation of a conventional image processing device.

DESCRIPTION OF THE PREFERRED EMBODIMENTS

Overall Configuration of an Image Processing Device

Figure 1:
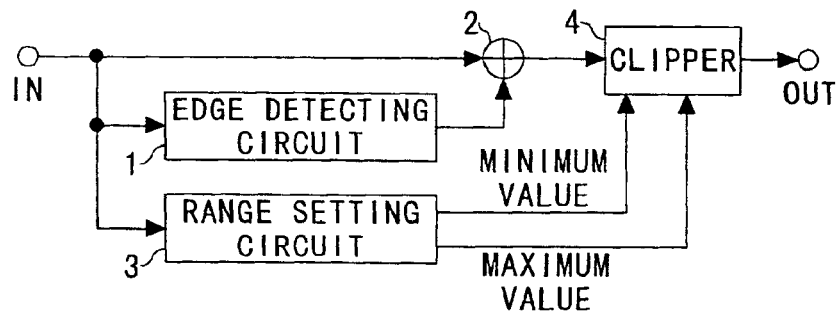
FIG. 1 is a block diagram showing the internal configuration of an image processing device embodying the invention.

First, the overall configuration of an image processing device embodying the invention will be described with reference to the drawings. FIG. 1 is a block diagram showing the internal configuration of an image processing device embodying the invention.

The image processing device shown in FIG. 1 has an edge detecting circuit 1 that outputs edge signals by detecting edge components in image signals fed in via an input terminal IN, an adder circuit 2 that superimposes the edge signals produced by the edge detecting circuit 1 on the image signals fed in via the input terminal IN, a range setting circuit 3 that sets the minimum and maximum values of the range in which the image signal currently being fed in is allowed to vary on the basis of the image signals output from a plurality of pixels preceding and following the pixel from which the image signal is currently being fed in, and a clipper 4 to which the range setting circuit 3 feeds the minimum and maximum values of the range in which the image signal currently being fed in is allowed to vary.

In the image processing device configured as described above, when image signals are fed in via the input terminal IN, the edge detecting circuit 1 performs second-order differentiation on the image signals to detect edge components present therein, and outputs the thus detected edge components as edge signals. The internal configuration of this edge detecting circuit 1, which produces edge signals in this way, is shown in FIG. 2.

Figure 2:
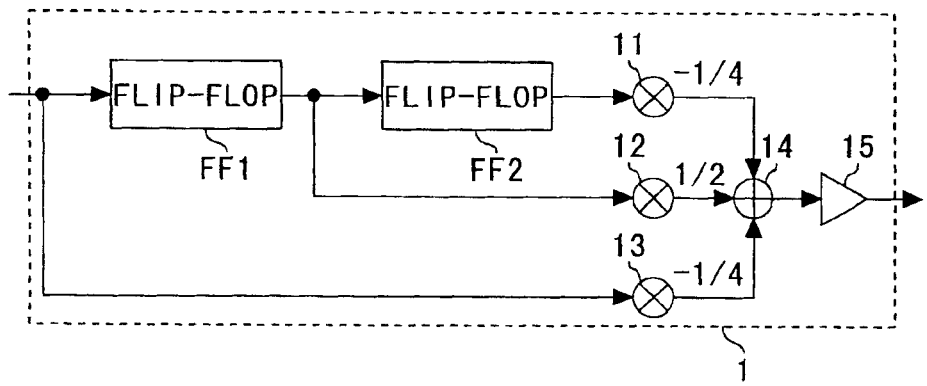
FIG. 2 is a block diagram showing the internal configuration of the edge detecting circuit.

The edge detecting circuit 1 shown in FIG. 2 has a flip-flop FF1 to which the image signals are fed from the input terminal IN, a flip-flop FF2 to which the image signals output from the flip-flop FF1 are fed, a multiplier circuit 11 that multiplies the image signals output from the flip-flop FF2 by $-\frac{1}{4}$, a multiplier circuit 12 that multiplies the image signals output from the flip-flop FF1 by $\frac{1}{2}$, a multiplier circuit 13 that multiplies the image signals fed in via the input terminal IN by $-\frac{1}{4}$, an adder circuit 14 that adds together the outputs from the multiplier circuits 11, 12, and 13, and an amplifier 15 that amplifies the output from the adder circuit 14 by a factor of $\alpha$.

In the edge detecting circuit 1 configured as described above, when the image signals G1, G2, and G3 output from adjacent pixels are fed in via the input terminal IN consecutively, in the order G1, G2, and G3, the image signal G1 is stored in the flip-flop FF2, and the image signal G2 is stored in the flip-flop FF1. Then, the image signals G1, G2, and G3 are fed to the multiplier circuits 11, 12, and 13, respectively. Let the data values of the image signals G1, G2, and G3 be g1, g2, and g3, respectively. Then, the multiplier circuits 11, 12, and 13 output data values $-\frac{1}{4} \times g1$, $\frac{1}{2} \times g2$, and $-\frac{1}{4} \times g3$, respectively. These data values are then added together by the adder circuit 14, and the resulting sum is then amplified by a factor of $\alpha$ by the amplifier 15. Thus, a data value $\alpha \times (-\frac{1}{4} \times g1 + \frac{1}{2} \times g2 - \frac{1}{4} \times g3)$ is fed to the adder circuit 2.

The data value output from the adder circuit 14 can be expressed as $[(g2-g1)-(g3-g2)]/4$, which is the result of second-order differentiation performed for the pixel that has produced the image signal G2. Thus, in the edge detecting circuit 1, when the image signal G3 is fed in, second-order differentiation is performed for the image signal G2 to detect an edge component, which is then fed out, as an edge signal, through the amplifier 15.

The image signals fed in via the input terminal IN are also fed to the range setting circuit 3. The range setting circuit 3 compares each of the image signals fed thereto from the individual pixels with the image signals output from a plurality of pixels preceding and following that pixel, and sets the range in which the data value of that pixel is allowed to vary. Here, when the image signal G3 is fed to the edge detecting circuit 1 as described above, the range setting circuit 3 sets the range in which the data value of the image signal G2 is allowed to vary, calculates the minimum value gmi2 and the maximum value gma2 of that range, and feeds those values to the clipper 4. To permit the edge detecting circuit 1 and the range setting circuit 3 to process the same image signal at a given time in this way, a delay circuit or the like is provided within the edge detecting circuit 1 for timing adjustment. The range setting circuit 3 will be described in detail later.

The adder circuit 2 adds the edge signals produced by the edge detecting circuit 1 to the image signals fed in via the input terminal IN. Here, when the image signal G3 is fed to the edge detecting circuit 1 as described above, the edge component for the image signal G2 is fed to the adder circuit 2. Thus, to permit the adder circuit 2 to add the edge component produced for the image signal G2 by the edge detecting circuit 1 to the image signal G2, a delay circuit or the like is provided within the adder circuit 2 for timing adjustment. As a result of the adder circuit 2 operating in this way, the image signal G2, after being processed by the adder circuit 2, has a data value $g2-\alpha \times (\frac{1}{4} \times g1 - \frac{1}{2} \times g2 + \frac{1}{4} \times g3)$.

The image signals thus having their edge components added thereto by the adder circuit 2, i.e. the image signals thereby edge-enhanced, are then fed to the clipper 4. The clipper 4 compares the data value of each image signal with the minimum and maximum values fed thereto from the range setting circuit 3 to check whether or not the data value of that image signal falls within the range in which it is allowed to vary as set by the range setting circuit 3. Specifically, when the data value of the image signal G2, i.e. $g2-\alpha \times (\frac{1}{4} \times g1 - \frac{1}{2} \times g2 + \frac{1}{4} \times g3)$ (hereinafter let $g2a = g2 - \alpha \times (\frac{1}{4} \times g1 - \frac{1}{2} \times g2 + \frac{1}{4} \times g3)$, is fed from the adder circuit 2 to the clipper 4 as described above, this data value is compared with the minimum and maximum values gmi2 and gma2 of the range in which the data value of the image signal G2 is allowed to vary as set by the range setting circuit 3.

According to the value g2a of the image signal G2 fed from the adder circuit 2 to the clipper 4, the clipper 4, if g2a<gmi2, clips the data value g2a of the image signal G2 at gmi2 and, if g2a>gma2, clips it at gma2. On the other hand, if gmi2$\leq$g2a$\leq$gma2, the clipper 4 leaves the data value g2a intact as the data value of the image signal G2. The internal configuration of this clipper 4, which sets the data value of each image signal according to the range in which it is allowed to vary as set by the range setting circuit 3 in this way, is shown in FIG. 3.

Figure 3:
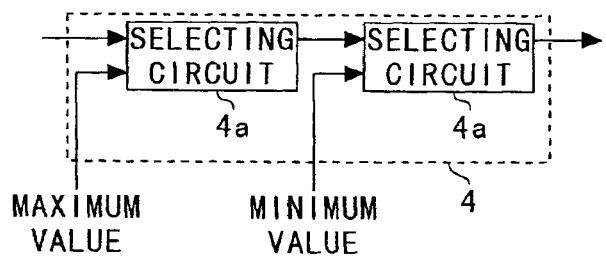
FIG. 3 is a block diagram showing the internal configuration of the clipper.

The clipper 4 shown in FIG. 3 is composed of a selecting circuit 4a that receives, on one hand, an image signal having its edge signal added thereto from the adder circuit 2 and, on the other hand, the maximum value from the range setting circuit 3 and a selecting circuit 4b that receives, on one hand, the output from the selecting circuit 4a and, on the other hand, the minimum value from the range setting circuit 3. In the clipper 4 configured as described above, the selecting circuit 4a chooses, between the two signals fed thereto, the one having the lower data value, and the selecting circuit 4b chooses, between the two signals fed thereto, the one having the higher data value. In the selecting circuits 4a and 4b, if the two signals fed thereto have equal data values, the selecting circuit 4a chooses the output from the adder circuit 2, and the selecting circuit 4b chooses the output from the selecting circuit 4a.

Specifically, when the data value g2a of the image signal G2 is output from the adder circuit 2 as described above, first, the selecting circuit 4a compares this data value g2a with the maximum value gma2, and outputs the lower data value as the data value of the image signal G2 to the selecting circuit 4b. Thus, either the data value gma2, if g2a>gma2, or the data value g2a, if g2a≦gma2, is chosen and output as the data value of the image signal G2. To permit the selecting circuit 4a to process simultaneously the image signal G2 output from the adder circuit 2 and the maximum value of the range in which the data value of the image signal G2 is allowed to vary, a delay circuit or the like is provided within the selecting circuit 4a for timing adjustment.

Let the data value chosen by the selecting circuit 4a be g2b. Next, the selecting circuit 4b compares this data value g2b with the minimum value gmi2, and outputs the higher data value as the data value of the image signal G2 to an output terminal OUT. Thus, either the data value gmi2, if g2b<gmi2, or the data value g2b, if g2b≧gmi2, is chosen and output as the data value of the image signal G2 to the output terminal OUT. To permit the selecting circuit 4b to process simultaneously the image signal G2 output from the selecting circuit 4a and the minimum value of the range in which the data value of the image signal G2 is allowed to vary, a delay circuit or the like is provided within the selecting circuit 4b for timing adjustment.

The internal configuration of the image processing device described above is common to both of the embodiments described below. Therefore, in the following descriptions of the embodiments, only the range setting circuit, which is configured differently between the embodiments, will be explained, and the explanations of the other blocks will not be repeated.

First Embodiment

Figure 4:
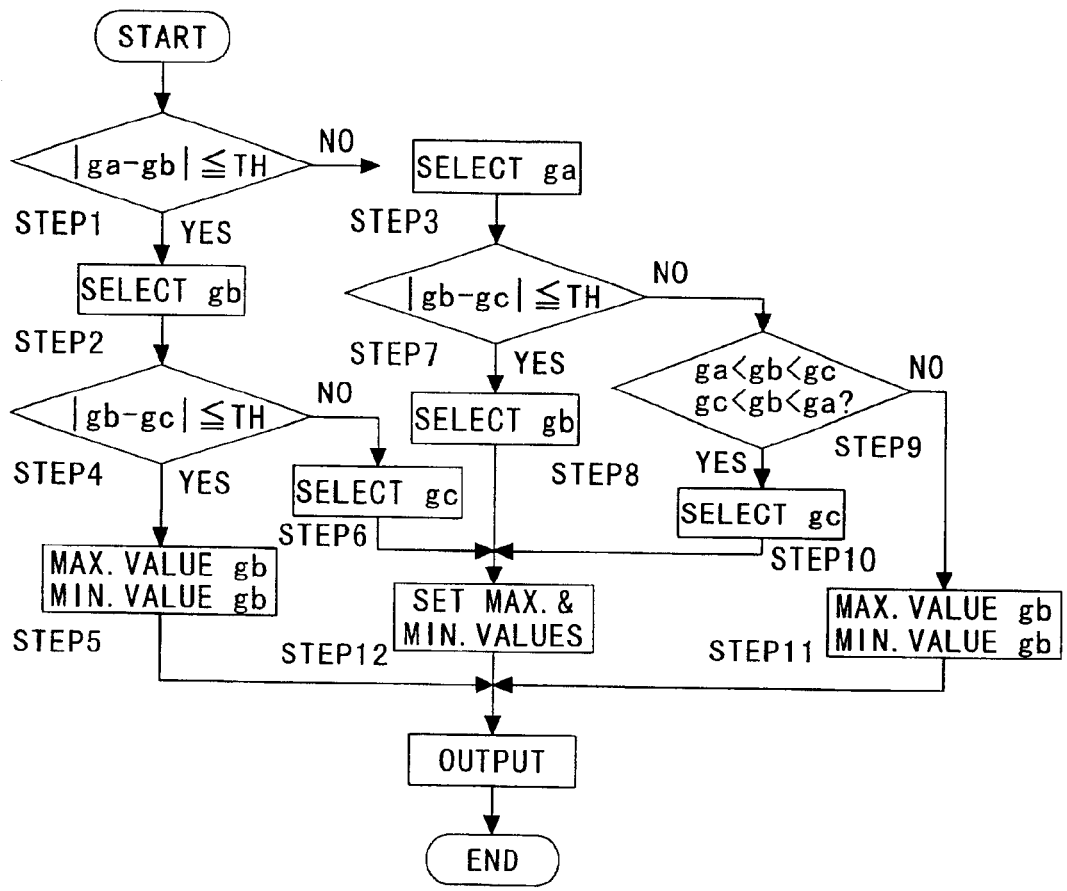
FIG. 4 is a flow chart showing the operation of the range setting circuit in the image processing device of a first embodiment of the invention.

A first embodiment of the invention will be describe below with reference to the drawings. FIG. 4 is a flow chart showing the operation of the range setting circuit in the image processing device of this embodiment.

Suppose that, now, an image signal Gb is currently being targeted as the one for which the range in which its data value (called the target data value) is allowed to vary is about to be set, and that the image signal Gb is fed in immediately after an image signal Ga and immediately before an image signal Gc. In this case, it is when the image signal Gc is fed to the range setting circuit 3 (FIG. 1) that the range in which the data value of the image signal Gb is allowed to vary is set. Let the data values of the image signals Ga, Gb, and Gc be ga, gb, and gc, respectively.

Thus, when the image signal Gc is fed in via the input terminal IN (FIG. 1), first, the difference |ga−gb| between the data values of the image signals Ga and Gb is compared with a predetermined threshold value TH (STEP 1). If |ga−gb|≦TH, the data value gb of the image signal Gb is chosen as a candidate for the maximum or minimum value that determines the range in which the target data value is allowed to vary (STEP 2). By contrast, if |ga−gb|>TH, the data value ga of the image signal Ga is chosen as a candidate for the maximum or minimum value that determines the range in which the target data value is allowed to vary (STEP 3).

When the flow proceeds from STEP 1 to STEP2, then the difference |gb−gc| between the data values of the image signals Gb and Gc is compared with the predetermined threshold value TH (STEP 4). If |gb−gc|≦TH, the data value gb of the image signal Gb is chosen as a candidate for the maximum or minimum value that determines the range in which the target data value is allowed to vary (STEP 5). In this case, as a candidate for the maximum or minimum value, the data value gb of the image signal Gb has been chosen in both STEP 2 and STEP 5, and therefore this data value gb is set as the maximum and minimum values. Then, the flow proceeds to STEP 13, where the data value gb thus set as the maximum and minimum values is fed to the clipper 4 (FIG. 1).

If, in STEP 4, |gb−gc|>TH, the data value gc of the image signal Gc is chosen as a candidate for the maximum or minimum value that determines the range in which the target data value is allowed to vary (STEP 6). In this case, as a candidate for the maximum or minimum value that determines the range in which the target data value is allowed to vary, the data value gb has been chosen in STEP 2, and the data value gc has been chosen in STEP 6; thus, of these data values gb and gc, the one having the higher data value is set as the maximum value, and the one having the lower data value is set as the minimum value (STEP 12). The maximum and minimum values thus set are then fed to the clipper 4 (FIG. 1) (STEP 13).

On the other hand, when the flow proceeds from STEP 1 to STEP3, then the difference |gb−gc| between the data values of the image signals Gb and Gc is compared with the predetermined threshold value TH (STEP 7). If |gb−gc|≦TH, the data value gb of the image signal Gb is chosen as a candidate for the maximum or minimum value that determines the range in which the target data value is allowed to vary (STEP 8). In this case, as a candidate for the maximum or minimum value that determines the range in which the target data value is allowed to vary, the data value ga has been chosen in STEP 3, and the data value gb has been chosen in STEP 8; thus, of these data values ga and gb, the one having the higher data value is set as the maximum value, and the one having the lower data value is set as the minimum value (STEP 12). The maximum and minimum values thus set are then fed to the clipper 4 (FIG. 1) (STEP 13).

If, in STEP 7, |gb−gc|>TH, then whether or not the data values ga, gb, and gc of the image signals Ga, Gb, and Gc satisfy the condition ga<gb<gc or gc<gb<ga is checked (STEP 9). If the data values ga, gb, and gc satisfy either of the conditions, the data value gc of the image signal Gc is chosen as a candidate for the maximum or minimum value that determines the range in which the target data value is allowed to vary (STEP 10). In this case, as a candidate for the maximum or minimum value that determines the range in which the target data value is allowed to vary, the data value ga has been chosen in STEP 3, and the data value gc has been chosen in STEP 10; thus, of these data values ga and gc, the one having the higher data value is set as the maximum value, and the one having the lower data value is set as the minimum value (STEP 12). The maximum and minimum values thus set are then fed to the clipper 4 (FIG. 1) (STEP 13).

If, in STEP 9, the data values ga, gb, and gc satisfy neither of the aforementioned conditions, the data value gb is chosen as both the maximum and minimum values that determine the range in which the target data value is allowed to vary (STEP 11). The maximum and minimum values thus set are then fed to the clipper 4 (FIG. 1) (STEP 13).

When the maximum and minimum values thus set as a result of the range setting circuit 3 operating as described above are fed to the clipper 4, the clipper 4 then determines the data value of the image signal Gb on the basis of those maximum and minimum values. It is to be noted that, in STEPs 1, 4, and 7, when the difference between two image signals is compared with the threshold value TH, the noise components that are superimposed on those image signals and of which the levels are lower than the threshold value TH are absorbed. This helps reduce the effect of such noise components on the operation of the range setting circuit 3.

Second Embodiment

Figure 5:
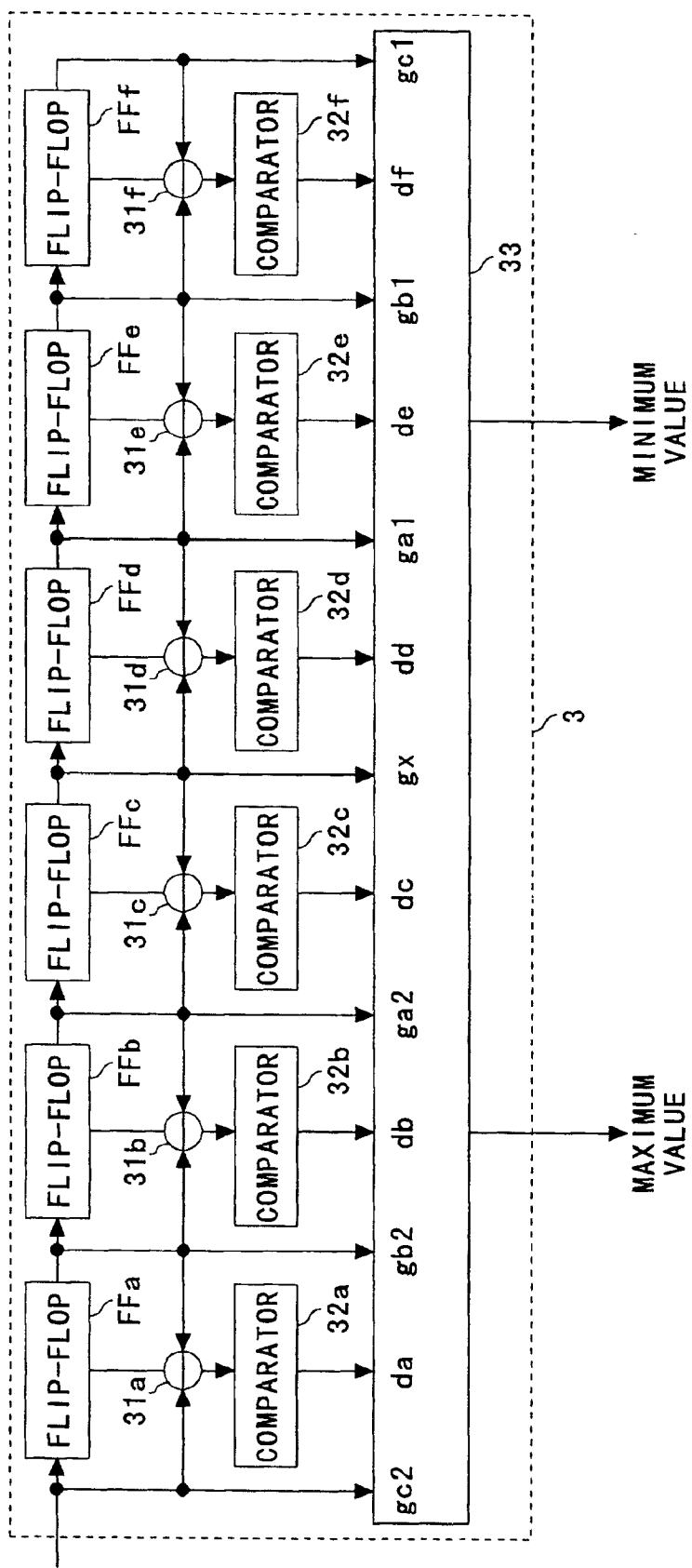
FIG. 5 is a block diagram showing the internal configuration of the range setting circuit in the image processing device of a second embodiment of the invention.

A second embodiment of the invention will be describe below with reference to the drawings. FIG. 5 is a block diagram showing the internal configuration of the range setting circuit in the image processing device of this embodiment.

The range setting circuit 3 shown in FIG. 5 is composed of flip-flops FFa, FFb, FFc, FFd, FFe, and FFf for storing image signals, subtractor circuits 31a, 31b, 31c, 31d, 31e, and 31f that calculate differences between every two consecutive image signals, comparators 32a, 32b, 32c, 32d, 32e, and 32f that compare the differences between image signals output from the subtractor circuits 31a, 31b, 31c, 31d, 31e, and 31f with threshold values ±TH, and a decoder 33 that sets the maximum or minimum value that determines the range in which the target data value is allowed to vary.

In the range setting circuit 3 configured as described above, the image signal fed in via the input terminal IN is fed to the flip-flop FFa, to the subtractor circuit 31a, and to the decoder 33. The image signal output from the flip-flop FFa is fed to the flip-flop FFb, to the subtractor circuits 31a and 31b, and to the decoder 33. The image signal output from the flip-flop FFb is fed to the flip-flop FFc, to the subtractor circuits 31b and 31c, and to the decoder 33. The image signal output from the flip-flop FFc is fed to the flip-flop FFd, to the subtractor circuits 31c and 31d, and to the decoder 33. The image signal output from the flip-flop FFd is fed to the flip-flop FFe, to the subtractor circuits 31d and 31e, and to the decoder 33. The image signal output from the flip-flop FFe is fed to the flip-flop FFf, to the subtractor circuits 31e and 31f, and to the decoder 33. The image signal output from the flip-flop FFf is fed to the subtractor circuit 31f and to the decoder 33.

The subtractor circuit 31a subtracts the image signal output from the flip-flop FFa from the image signal fed in via the input terminal IN. The subtractor circuit 31b subtracts the image signal output from the flip-flop FFb from the image signal output from the flip-flop FFa. The subtractor circuit 31c subtracts the image signal output from the flip-flop FFc from the image signal output from the flip-flop FFb. The subtractor circuit 31d subtracts the image signal output from the flip-flop FFc from the image signal output from the flip-flop FFd. The subtractor circuit 31e subtracts the image signal output from the flip-flop FFd from the image signal output from the flip-flop FFe. The subtractor circuit 31f subtracts the image signal output from the flip-flop FFe from the image signal output from the flip-flop FFf The results of the subtraction performed by the subtractor circuits 31a to 31f are fed to the comparators 32a to 32f, respectively, so as to be compared with the threshold values ±TH. The comparators 32a to 32f individually output, to the decoder 33, a "positive" sign if the subtraction result from the corresponding one of the subtractor circuits 31a to 31f is greater than +TH, a "negative" sign if the subtraction result from the corresponding one of the subtractor circuits 31a to 31f is smaller than −TH, or a "zero" sign if the subtraction result from the corresponding one of the subtractor circuits 31a to 31f is equal to or greater than −TH or equal to or smaller than +TH.

On the basis of these signs fed from the comparators 32a to 32f, the decoder 33 selects the maximum and minimum data values from among the data values of the seven image signals fed in via the input terminal IN and output from the flip-flops FFa to FFf, and feeds the thus selected maximum and minimum data values to the clipper 4 (FIG. 1).

Now, how the range setting circuit 3 configured as described above operates will be described. Suppose that image signals Gc2, Gb2, Ga2, Gx, Ga1, Gb1, and Gc1 are fed in in the order Gc1, Gb1, Ga1, Gx, Ga2, Gb2, and Gc2, and that the image signal Gx is currently being targeted as the one for which the maximum and minimum values that determine the range in which its data value is allowed to vary is about to be set. Let the data values of the image signals Gc2, Gb2, Ga2, Gx, Ga1, Gb1, and Gc1 be gc2, gb2, ga2, gx, ga1, gb1, and gc1, respectively.

When the image signals are fed in in the order Gc1, Gb1, Ga1, Gx, Ga2, Gb2, and Gc2, the data values gb2, ga2, gx, ga1, gb1, and gc1 of the image signals Gb2, Ga2, Gx, Ga1, Gb1, and Gc1 are stored in the flip-flops FFa, FFb, FFc, FFd, FFe, and FFf, respectively. When the image signal Gc2 is fed in via the input terminal IN, the flip-flops FFa, FFb, FFc, FFd, FFe, and FFf output the image signals Gb2, Ga2, Gx, Ga1, Gb1, and Gc1, and the image signals Gc2, Gb2, Ga2, Gx, Ga1, and Gb1 are fed to the flip-flops FFa, FFb, FFc, FFd, FFe, and FFf.

At this point, the subtractor circuits 31a, 31b, 31c, 31d, 31e, and 31f individually perform subtraction and output their respective subtraction results (gc2−gb2), (gb2−ga2), (ga2−gx), (ga1−gx), (gb1−ga1), and (gc1−gb1) to the comparators 32a, 32b, 32c, 32d, 32e, and 32f. Then, the comparators 32a, 32b, 32c, 32d, 32e, and 32f compare these subtraction results (gc2−gb2), (gb2−ga2), (ga2−gx), (ga1−gx), (gb1−ga1), and (gc1−gb1) with the threshold values ±TH, and output their respective comparison results, as signs da, db, dc, dd, de, and df, to the decoder 33. These signs da, db, dc, dd, de, and df each represent one of the three aforementioned states, namely "positive," "negative," and "zero." In the following descriptions, the states "positive," "negative," and "zero" are represented simply by "+," "−," and "0," respectively.

1. When (dc, dd)=(+, +), (dc, dd)=(−, −), or (dc, dd)=(0, 0)

When both of the signs dc and dd are "+," "−," or "0," irrespective of the values of the other signs da, db, de, and df, the decoder 33 selects the data value gx of the image signal Gx as the maximum and minimum values, and outputs these maximum and minimum values to the clipper 4.

2. When (dc, dd)=(0, +)

When the sign dc is "0" and the sign dd is "+," irrespective of the values of the signs da and db, the decoder 33 selects the data value gx of the image signal Gx as the minimum value, and outputs this minimum value to the clipper 4. On the other hand, as the maximum value, the decoder 33 selects and outputs different data values according to whether (a) de=0 or −, (b) (de, df)=(+, 0) or (+, −), or (c) (de, df)=(+, +) as described below.

(a) When de=0 or −

Irrespective of the value of the sign df, the data value ga1 of the image signal Ga1 is selected as the maximum value and is output to the clipper 4.

(b) When (de, df)=(+, 0) or (+, −)

The data value gb1 of the image signal Gb1 is selected as the maximum value and is output to the clipper 4.

(c) When (de, df)=(+, +)

The data value gc1 of the image signal Gc1 is selected as the maximum value and is output to the clipper 4.

3. When (dc, dd)=(0, −)

When the sign dc is "0" and the sign ad is "−," irrespective of the values of the signs da and db, the decoder 33 selects the data value gx of the image signal Gx as the maximum value, and outputs this maximum value to the clipper 4. On the other hand, as the minimum value, the decoder 33 selects and outputs different data values according to whether (a) de=0 or +, (b) (de, df)=(−, 0) or (−, +), or (c) (de, df)=(−, −) as described below.

(a) When de=0 or +

Irrespective of the value of the sign df, the data value ga1 of the image signal Ga1 is selected as the minimum value and is output to the clipper 4.

(b) When (de, df)=(−, 0) or (−, +)

The data value gb1 of the image signal Gb1 is selected as the minimum value and is output to the clipper 4.

(c) When (de, df)=(−, −)

The data value gc1 of the image signal Gc1 is selected as the minimum value and is output to the clipper 4.

4. When (dc, dd)=(+, 0)

When the sign dc is "+" and the sign ad is "0," irrespective of the values of the signs de and df, the decoder 33 selects the data value gx of the image signal Gx as the minimum value, and outputs this minimum value to the clipper 4. On the other hand, as the maximum value, the decoder 33 selects and outputs different data values according to whether (a) db=0 or −, (b) (da, db)=(0, +) or (−, +), or (c) (da, db)=(+, +) as described below.

(a) When db=0 or −

Irrespective of the value of the sign da, the data value ga2 of the image signal Ga2 is selected as the maximum value and is output to the clipper 4.

(b) When (da, db)=(0, +) or (−, +)

The data value gb2 of the image signal Gb2 is selected as the maximum value and is output to the clipper 4.

(c) When (da, db)=(+, +)

The data value gc2 of the image signal Gc2 is selected as the maximum value and is output to the clipper 4.

5. When (dc, dd)=(−, 0)

When the sign dc is "−" and the sign dd is "0," irrespective of the values of the signs de and df, the decoder 33 selects the data value gx of the image signal Gx as the maximum value, and outputs this maximum value to the clipper 4. On the other hand, as the minimum value, the decoder 33 selects and outputs different data values according to whether (a) db=0 or +, (b) (da, db)=(0, −) or (+, −), or (c) (da, db)=(−, −) as described below.

(a) When db=0 or +

Irrespective of the value of the sign da, the data value ga2 of the image signal Ga2 is selected as the minimum value and is output to the clipper 4.

(b) When (da, db)=(0, −) or (+, −)

The data value gb2 of the image signal Gb2 is selected as the minimum value and is output to the clipper 4.

(c) When (da, db)=(−, −)

The data value gc2 of the image signal Gc2 is selected as the minimum value and is output to the clipper 4.

6. When (dc, dd)=(−, +)

As the minimum value, the decoder 33 selects and outputs different data values according to whether (a) db=0 or +, (b) (da, db) =(0, −) or (+, −, or (c) (da, db) =(−, −) as described below.

(a) When db=0 or +

Irrespective of the value of the sign da, the data value ga2 of the image signal Ga2 is selected as the minimum value and is output to the clipper 4.

(b) When (da, db)=(0, −) or (+, −)

The data value gb2 of the image signal Gb2 is selected as the minimum value and is output to the clipper 4.

(c) When (da, db)=(−, −)

The data value gc2 of the image signal Gc2 is selected as the minimum value and is output to the clipper 4.

On the other hand, as the maximum value, the decoder 33 selects and outputs different data values according to whether (a) de=0 or −, (b) (de, df)=(+, 0) or (+, −), or (c) (de, df)=(+, +) as described below.

(a) When de=0 or −

Irrespective of the value of the sign df, the data value ga1 of the image signal Ga1 is selected as the maximum value and is output to the clipper 4.

(b) When (de, df)=(+, 0) or (+, −)

The data value gb1 of the image signal Gb1 is selected as the maximum value and is output to the clipper 4.

(c) When (de, df)=(+, +)

The data value gc1 of the image signal Gc1 is selected as the maximum value and is output to the clipper 4.

7. When (de, dd)=(+, −)

As the minimum value, the decoder 33 selects and outputs different data values according to whether (a) de=0 or +, (b) (de, df)=(−, 0) or (−, +),or (c) (de, df)=(−, −) as described below.

(a) When de=0 or +

Irrespective of the value of the sign df, the data value ga1 of the image signal Ga1 is selected as the minimum value and is output to the clipper 4.

(b) When (de, df)=(−, 0) or (−, +)

The data value gb1 of the image signal Gb1 is selected as the minimum value and is output to the clipper 4.

(c) When (de, df)=(−, −)

The data value gc1 of the image signal Gc1 is selected as the minimum value and is output to the clipper 4.

On the other hand, as the maximum value, the decoder 33 selects and outputs different data values according to whether (a) db=0 or −, (b) (da, db)=(0, +) or (−, +), or (c) (da, db)=(+, +) as described below.

(a) When db=0 or −

Irrespective of the value of the sign da, the data value ga2 of the image signal Ga2 is selected as the maximum value and is output to the clipper 4.

(b) When (da, db)=(0, +) or (−, +)

The data value gb2 of the image signal Gb2 is selected as the maximum value and is output to the clipper 4.

(c) When (da, db)=(+, +)

The data value gc2 of the image signal Gc2 is selected as the maximum value and is output to the clipper 4.

Figure 6:
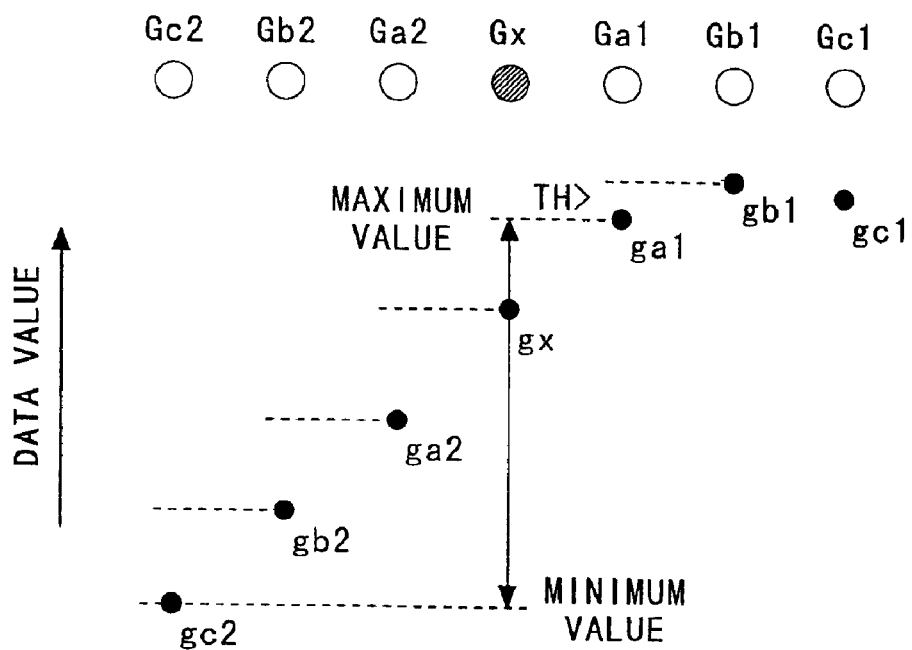
FIG. 6 is a diagram showing examples of image signals fed to the image processing device.

More specifically, when the image signals Gc2, Gb2, Ga2, Gx, Ga1, Gb1, and Gc1 have signal values as shown in FIG. 6, the range setting circuit 3 operates as follows. Suppose, here also, that the image signals shown in FIG. 6 are fed in in the order Gc1, Gb1, Ga1, Gx, Ga2, Gb2, and Gc2, and that the image signal Gx is currently being targeted as the one for which the maximum and minimum values that determine the range in which its data value is allowed to vary is about to be set.

As described earlier, when the image signals Gc2, Gb2, Ga2, Gx, Ga1, Gb1, and Gc1 are output from the flip-flops FFa to FFf and fed in via the input terminal IN, the subtractor circuits 31$a$ to 31$f$ individually perform subtraction and output their respective subtraction results (gc2−gb2), (gb2−ga2), (ga2−gx), (ga1−gx), (gb1−ga1), and (gc1−gb1) to the comparators 32$a$, 32$b$, 32$c$, 32$d$, 32$e$, and 32$f$. Here, assume that, as shown in FIG. 6, the data values of the image signals satisfy the following relations: (gc2−gb2)<−TH, (gb2−ga2)<−TH, (ga2−gx)<−TH, (ga1−gx)>TH, −TH≦(gb1−ga1)≦TH, and −TH≦(gc1−gb1)≦TH.

At this point, the signs da, db, dc, ad, de, and df output from the comparator 32$a$ to 32$f$ are: (da, db, dc, ad, de, df)=(−, −, −, +, 0, 0). Fed with the signs da to df with these values, the decoder 33 selects the data value gc2 of the image signal Gc2 as the minimum value and the data value ga1 of the image signal Ga1 as the maximum value, and outputs these minimum and maximum values to the clipper 4.

In this embodiment, the range setting circuit 3 sets the maximum and minimum values of the data value of the image signal to be corrected by the clipper 4 on the basis of the relationship of that image signal with three image signals preceding and three image signals following that image signal. However, the image signals so referred to are not limited to three image signals preceding and three image signals following the target image signal. The range setting circuit 3 may be configured in any other manner than is specifically shown in FIG. 5, as long as it operates in the same manner as in this embodiment.

Figure 7A:
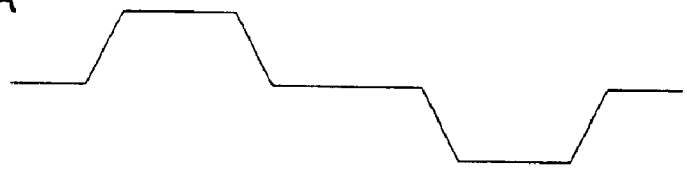
FIGS. 7A to 7D are time charts of relevant signals, illustrating the operation of an image processing device embodying the invention.
Figure 7B:
Figure 7C:

In the image processing devices of the first and second embodiments described above, as a result of the operation of the range setting circuit 3, image signals are processed as follows. When image signals as shown in FIG. 7A are fed in, first, the edge detecting circuit 1 performs second-order differentiation on those image signals (FIG. 7A) to produce edge signals as shown in FIG. 7B. Then, the adder circuit 2 adds together the image signals (FIG. 7A) and the edge signals (FIG. 7B) to produce image signals as shown in FIG. 7C that have such transient characteristics as to include overshoots and preshoots occurring in the portions thereof corresponding to edges.

Figure 7D:
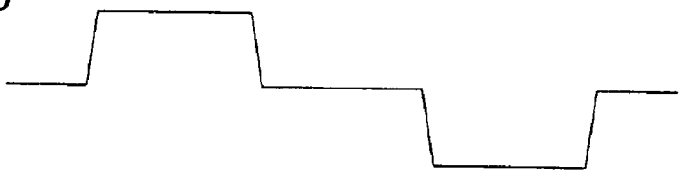

Then, the clipper 4 clips these image signals (FIG. 7C) within the range set by the range setting circuit 3. As a result, image signals as shown in FIG. 7D are output that have been edge-enhanced and that have their transient characteristics improved.

According to the present invention, the range in which the data value of a target signal is to be clipped by a clipping circuit is set on the basis of the data values obtained by comparing the target signal with the signals nearest thereto, then those nearest signals with the second nearest, and so forth, i.e. by comparing pairs of consecutive image signals in order of proximity to the target image signal. Thus, for example, in a case where the signal so clipped by the clipping circuit is an image signal, and the image signal is clipped after being edge-enhanced, i.e. after having an edge signal, as obtained by performing second-order differentiation on the image signal, superposed thereon, it is possible to eliminate overshoots and undershoots resulting from edge enhancement. Accordingly, image signals, when processed by an image processing device provided with a clipping circuit operating in this way, have their transient characteristics improved as well as being edge-enhanced. In an image obtained by reproducing image signals obtained in such a way, ringing is satisfactorily suppressed.

What is claimed is:

1. A clipping circuit comprising:
a clipper for clipping a target signal fed thereto within a range of data values set for the target signal;
a subtractor for subtracting, from a data value of the target signal to be clipped by the clipper, each of data values of adjacent signals located a predetermined interval away from the target signal before and after the target signal;
a minimum value setter for setting, as a minimum value of the range of data values for the target signal, the data value of one of the two adjacent signals that, when subtracted from the data value of the target signal, yields a difference greater than a first threshold value; and
a maximum value setter for setting, as a maximum value of the range of data values for the target signal, the data value of one of the two adjacent signals that, when subtracted from the data value of the target signal, yields a difference smaller than a second threshold value,
wherein, when the data value of the target signal fed to the clipper falls within the range of data values set for the target signal by the maximum value and minimum value setters, the target signal is output intact,
when the data value of the target signal fed to the clipper is smaller than the minimum value, the target signal is output after being clipped at the minimum value, and,
when the data value of the target signal fed to the clipper is greater than the maximum value, the target signal is output after being clipped at the maximum value.

2. A clipping circuit as claimed in claim 1,
wherein, in the minimum value setter, if the differences between the data value of the target signal and each of the data values of the adjacent signals located before and after the target signal have same signs or are both equal to or greater than the first threshold value, the data value of the target signal is set as the minimum value, and
wherein, in the maximum value setter, if the differences between the data value of the target signal and each of the data values of the adjacent signals located before and after the target signal have same signs or are both equal to or smaller than the second threshold value, the data value of the target signal is set as the maximum value.

3. A clipping circuit comprising:
a clipper for clipping a target signal fed thereto within a range of data values set for the target signal;
a first subtractor for calculating, for the target signal to be clipped by the clipper and a plurality of signals located at predetermined intervals from one another before and after the target signal, a difference between data values of every two adjacent signals by subtracting the data value of one of those two signals farther from the target signal from the data value of one of those two signals nearer to the target signal, in order of proximity to the target signal;
a second subtractor for calculating a difference between the data value of each of the two adjacent signals nearest to the target signal and the data value of the target signal by subtracting the data value of that adjacent signal from the data value of the target signal;
a minimum value setter for setting, as a minimum value of the range of data values for the target signal, the data value of whichever is nearer to the target signal out of two signals whose data value, when processed by the first subtractor, yields a difference smaller than a first threshold value and that are located farther than one of the adjacent signals whose data value, when processed by the second subtractor, yields a difference greater than the first threshold value; and
a maximum value setter for setting, as a maximum value of the range of data values for the target signal, the data value of whichever is nearer to the target signal out of two signals whose data value, when processed by the first subtractor, yields a difference greater than a second threshold value and that are located farther than one of the adjacent signals whose data value, when processed by the second subtractor, yields a difference smaller than the first threshold value, wherein, when the data value of the target signal fed to the clipper falls within the range of data values set for the target signal by the maximum value and minimum value setters, the target signal is output intact, when the data value of the target signal fed to the clipper is smaller than the minimum value, the target signal is output after being clipped at the minimum value, and, when the data value of the target signal fed to the clipper is greater than the maximum value, the target signal is output after being clipped at the maximum value.

4. A clipping circuit as claimed in claim 3, wherein, in the minimum value setter, if the differences, as calculated by the second subtractor, between the data value of the target signal and each of the data values of the adjacent signals located before and after the target signal have same signs or are both equal to or greater than the first threshold value, the data value of the target signal is set as the minimum value, and wherein, in the maximum value setter, if the differences, as calculated by the second subtractor, between the data value of the target signal and each of the data values of the adjacent signals located before and after the target signal have same signs or are both equal to or smaller than the second threshold value, the data value of the target signal is set as the maximum value.

5. An image processing device comprising:

an edge detecting circuit for performing second-order differentiation on image signals fed thereto to detect edge components and output edge signals representing the edge components;

an edge enhancement circuit for superimposing the edge signals on the image signals to perform edge enhancement on the image signals;

a range setting circuit for comparing, for each of image signals obtained from individual pixels, a data value of a target image signal obtained from a pixel targeted by the edge enhancement with each of data values of two adjacent image signals obtained from pixels adjacent to the targeted pixel to set a range of data values in which the data value of the target image signal is allowed to vary by setting as a maximum value the data value of one of the two adjacent image signals whose data value is greater than the data value of the target image signal and setting as a minimum value the data value of one of the two adjacent image signals whose data value is smaller than the data value of the target image signal; and a clipper for making the data value of the target image signal equal to the maximum or minimum value of the range set by the range setting circuit when the data value of the target image signal output from the edge enhancement circuit is greater than the maximum value or smaller than the minimum value, respectively, of the range set by the range setting circuit, the clipper otherwise leaving intact the data value of the target image signal as obtained after the edge enhancement.

6. An image processing device as claimed in claim 5, wherein the range setting circuit sets, as the maximum value, the data value of one of the two adjacent image signals whose data value, when compared with the data value of the target image signal, yields a difference greater than a predetermined threshold value and whose data value is greater than the data value of the target image signal, and sets, as the minimum value, the data value of one of the two adjacent image signals whose data value, when compared with the data value of the target image signal, yields a difference greater than the predetermined threshold value and whose data value is smaller than the data value of the target image signal.

7. An image processing device as claimed in claim 6, wherein, when the difference between the data value of the target image signal and the data value of one of the two adjacent image signals is smaller than the threshold value, if the range setting circuit sets the data value of the other of the two adjacent image signals as the maximum value, the range setting circuit sets the data value of the target image signal as the minimum value, and, if the range setting circuit sets the data value of the other of the two adjacent image signals as the minimum value, the range setting circuit sets the data value of the target image signal as the maximum value, and when the difference between the data value of the target image signal and the data value of either of the two adjacent image signals is smaller than the threshold value, the range setting circuit sets the data value of the target image signal as both the maximum and minimum values.

8. An image processing device as claimed in claim 6, wherein, when the data values of both of the two adjacent image signals are greater than the data value of the target image signal, or when the data values of both of the two adjacent image signals are smaller than the data value of the target image signal, the range setting circuit sets the data value of the target image signal as both the maximum and minimum values.

9. An image processing device comprising:

an edge detecting circuit for performing second-order differentiation on image signals fed thereto to detect edge components and output edge signals representing the edge components;

an edge enhancement circuit for superimposing the edge signals on the image signals to perform edge enhancement on the image signals;

a range setting circuit for comparing, for each of image signals obtained from individual pixels, data values of a plurality of consecutive image signals preceding and following a target image signal targeted by the edge enhancement to set a range of data values in which the data value of the target image signal is allowed to vary; and a clipper for making the data value of the target image signal equal to the maximum or minimum value of the range set by the range setting circuit when the data value of the target image signal output from the edge enhancement circuit is greater than the maximum value or smaller than the minimum value, respectively, of the range set by the range setting circuit, the clipper otherwise leaving intact the data value of the target image signal as obtained after edge enhancement, wherein the range setting circuit first compares the data value of the target image signal obtained from the targeted pixel with each of data values of two adjacent image signals obtained from pixels adjacent to the targeted pixel to set, as a maximum value setting image signal, one of the two adjacent image signals whose data value is greater than the data value of the target image signal and set, as a minimum value setting image signal, one of the two adjacent image signals whose data value is smaller than the data value of the target image signal, then compares the data value of the maximum value setting image signal with a data value of an image signal obtained from a pixel adjacent to the pixel that outputs the maximum value setting image signal so that, if the data value of the maximum value setting image signal is greater, the data value of the maximum value setting image signal is kept as the maximum value and, if the data value of the maximum value setting image signal is smaller, the maximum value setting image signal is replaced with the image signal that has been compared with the maximum value setting image signal and comparison is continued with a data value of an image signal obtained from a pixel further adjacent, and then similarly compares the data value of the minimum value setting image signal with a data value of an image signal obtained from a pixel adjacent to the pixel that outputs the minimum value setting image signal so that, if the data value of the minimum value setting image signal is smaller, the data value of the minimum value setting image signal is kept as the minimum value and, if the data value of the minimum value setting image signal is greater, the minimum value setting image signal is replaced with the image signal that has been compared with the minimum value setting image signal and comparison is continued with a data value of an image signal obtained from a pixel further adjacent.

10. An image processing device as claimed in claim 9, wherein the range setting circuit sets, as the maximum value, the data value of the maximum value setting image signal as it is when replacement of the maximum value setting image signal has taken place a predetermined number of times, and sets, as the minimum value, the data value of the minimum value setting image signal as it is when replacement of the minimum value setting image signal has taken place a predetermined number of times.

11. An image processing device as claimed in claim 9, wherein, if a difference between the data value of one of the two adjacent image signals and the data value of the target image signal is greater than a predetermined threshold value and in addition the data value of that adjacent image signal is greater than the data value of the target image signal, the range setting circuit sets that adjacent image signal as the maximum value setting image signal, and, if a difference between the data value of the maximum value setting image signal and the data value of the image signal adjacent to the maximum value setting image signal is greater than the predetermined threshold value and in addition the data value of this image signal adjacent to the maximum value setting image signal is greater than the data value of the maximum value setting image signal, the range setting circuit performs replacement of the maximum value setting image signal, and similarly if a difference between the data value of one of the two adjacent image signals and the data value of the target image signal is greater than the predetermined threshold value and in addition the data value of that adjacent image signal is smaller than the data value of the target image signal, the range setting circuit sets that adjacent image signal as the minimum value setting image signal, and, if a difference between the data value of the minimum value setting image signal and the data value of the image signal adjacent to the minimum value setting image signal is greater than the predetermined threshold value and in addition the data value of this image signal adjacent to the minimum value setting image signal is smaller than the data value of the minimum value setting image signal, the range setting circuit performs replacement of the minimum value setting image signal.

12. An image processing device as claimed in claim 11, wherein, when the difference between the data value of the target image signal and the data value of one of the two adjacent image signals is smaller than the threshold value, if the range setting circuit sets the data value of the other of the two adjacent image signals as the maximum value, the range setting circuit sets the data value of the target image signal as the minimum value, and, if the range setting circuit sets the data value of the other of the two adjacent image signals as the minimum value, the range setting circuit sets the data value of the target image signal as the maximum value, and when the difference between the data value of the target image signal and the data value of either of the two adjacent image signals is smaller than the threshold value, the range setting circuit sets the data value of the target image signal as both the maximum and minimum values.

13. An image processing device as claimed in claim 9, wherein, when the data values of both of the two adjacent image signals are greater than the data value of the target image signal, or when the data values of both of the two adjacent image signals are smaller than the data value of the target image signal, the range setting circuit sets the data value of the target image signal as both the maximum and minimum values.

* * * * *